United States Patent
Suzuki et al.

(10) Patent No.: US 10,262,823 B2
(45) Date of Patent: Apr. 16, 2019

(54) METHOD AND DEVICE FOR CONTROLLING RELAYS OF IN-VEHICLE MOTOR

(71) Applicant: Nissan Motor Co., Ltd., Yokohama-shi, Kanagawa (JP)

(72) Inventors: Taku Suzuki, Kanagawa (JP); Takafumi Kamemura, Kanagawa (JP); Yuki Miyashita, Kanagawa (JP); Masaki Shibuya, Kanagawa (JP); Hirotaka Mori, Kanagawa (JP); Tsubasa Tamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/745,801

(22) PCT Filed: Jul. 31, 2015

(86) PCT No.: PCT/JP2015/071784
§ 371 (c)(1),
(2) Date: Jan. 18, 2018

(87) PCT Pub. No.: WO2017/022009
PCT Pub. Date: Feb. 9, 2017

(65) Prior Publication Data
US 2018/0233311 A1    Aug. 16, 2018

(51) Int. Cl.
*H02P 1/00* (2006.01)
*H01H 47/02* (2006.01)
(Continued)

(52) U.S. Cl.
CPC .......... *H01H 47/02* (2013.01); *H01H 47/002* (2013.01); *H02P 3/06* (2013.01);
(Continued)

(58) Field of Classification Search
CPC ............ H01H 47/02; H02P 3/06; B62D 5/046
(Continued)

(56) References Cited

U.S. PATENT DOCUMENTS

| 2003/0169007 A1* | 9/2003 | Ashiya ..................... H02P 29/02 318/471 |
| 2011/0037430 A1* | 2/2011 | Jang ....................... B60L 3/0046 320/109 |

(Continued)

FOREIGN PATENT DOCUMENTS

| CN | 102991567 A | 3/2013 |
| CN | 103632859 A | 3/2014 |

(Continued)

OTHER PUBLICATIONS

JP 2012125253 English Machine Translation.*

*Primary Examiner* — Eduardo Colon Santana
*Assistant Examiner* — Gabriel Agared
(74) *Attorney, Agent, or Firm* — Global IP Counselors, LLP

(57) ABSTRACT

A relay control method is provided for controlling an in-vehicle motor that includes a steering angle main control module. The main control module has a power supply relay is connected to a battery, a motor drive circuit connected to a fixed contact of the power supply relay via a bus bar, and a phase relay connected to the motor drive circuit via a bus bar. The motor drive circuit contacts a heat radiation part that has a higher thermal conductivity than the power supply relay. After the ignition is turned off and with the switches for the power supply relay and the phase relay remaining in the on state, a motor energization control is performed for maintaining a rotation stop state in the motor for a predetermined time, and after the predetermined time has elapsed, the switch of the power supply relay is switched to off.

5 Claims, 13 Drawing Sheets

(51) Int. Cl.
  *H01H 47/00*  (2006.01)
  *H02P 3/06*  (2006.01)
  *H01H 1/62*  (2006.01)
  *H01H 3/00*  (2006.01)
  *B62D 5/04*  (2006.01)

(52) U.S. Cl.
  CPC .............. *B62D 5/046* (2013.01); *H01H 1/62* (2013.01); *H01H 3/001* (2013.01); *H01H 2239/036* (2013.01)

(58) Field of Classification Search
  USPC .......................................................... 318/139
  See application file for complete search history.

(56) References Cited

U.S. PATENT DOCUMENTS

2011/0128662 A1*  6/2011  Kato .................... B60L 3/0069
  361/166
  2013/0062137 A1  3/2013  Motoda
  2015/0115740 A1*  4/2015  Miura .................... H01H 47/00
  307/117

FOREIGN PATENT DOCUMENTS

| | | |
  |---|---|---|
  | CN | 104024553 A | 9/2014 |
  | JP | 11-260227 A | 9/1999 |
  | JP | 2004-120380 A | 4/2004 |
  | JP | 2007-18927 A | 1/2007 |
  | JP | 2010-132206 A | 6/2010 |
  | JP | 2011-210385 A | 10/2011 |
  | JP | 2013-62958 A | 4/2013 |
  | JP | 2014-120380 A | 6/2014 |
  | JP | 2014-156151 A | 8/2014 |
  | WO | 2013/180018 A1 | 12/2013 |
  | WO | WO 2013180018 A1 * | 12/2013 ............ B60L 11/126 |

* cited by examiner

METHOD AND DEVICE FOR CONTROLLING RELAYS OF IN-VEHICLE MOTOR

CROSS-REFERENCE TO RELATED APPLICATIONS

This application is a U.S. National stage application of International Application No. PCT/JP2015/071784, filed Jul. 31, 2015.

BACKGROUND

Field of the Invention

The present invention relates to a method and a device for controlling the relays of an in-vehicle motor, equipped with a motor control module having a phase relay, a motor drive circuit, and a power supply relay that are connected via bus bars inside a housing.

Background Information

Conventionally, when a temperature sensor detects a temperature that is zero degrees Celsius or lower, or a predetermined minus temperature or lower, the average drive current that is supplied to a relay coil is made to be smaller than the average drive current supplied at normal temperature. A relay control device that thereby prevents moisture evaporation due to heat generated by the relay coil under a low temperature environment is known (for example, see Japanese Laid Open Patent Application No. 2007-18927 referred to herein after as Patent Document 1).

SUMMARY

However, in the conventional device, a control is carried out to make the average drive current supplied to the relay coil smaller than the average drive current at normal temperature. Consequently, it is necessary to add to the relay control device an additional function for changing the electric current, which leads to increased costs.

Furthermore, even when attempting to reduce the average drive current that is supplied to the relay coil, there is a limit to how much the coil temperature can be reduced in the relay coil. In addition, for example, at an ambient temperature of extreme low temperature, when the power supply relay is turned off, the temperature of the fixed contact of the power supply relay will be greatly reduced. Therefore, there are cases in which a difference occurs between the fixed contact temperature and the temperature of the vicinity of the fixed contact (dependent on the relay coil temperature) of the power supply relay, so there is the problem that condensation may occur on the fixed contact.

In view of the problems described above, an object of the present invention is to provide a method and a device for controlling the relays of an in-vehicle motor that reduces the occurrence of condensation at a fixed contact of a power supply relay during a power supply relay interruption control, without causing an increase in cost due to addition of a function.

In order to achieve the above object, the present invention comprises a motor control module that has, inside a housing, a power supply relay that is connected to a battery, a motor drive circuit that is connected to a fixed contact of the power supply relay via a bus bar, and a phase relay that is connected to the motor drive circuit via a bus bar. The motor drive circuit is provided in contact with a heat radiation part that has higher thermal conductivity than the power supply relay. Also provided is a relay control method of this in-vehicle motor wherein, after an interruption operation of the power supply relay while the switches for the power supply relay and the phase relay remain in the on state, a motor energization control for maintaining a rotation stop state in a motor for a predetermined amount of time via the power supply relay, the motor drive circuit, and the phase relay, and after the predetermined amount of time has elapsed, the switch of the power supply relay is switched off.

Therefore, after an interruption operation of the power supply relay, with the switches for the power supply relay and the phase relay remaining in the on state, a motor energization control for maintaining a rotation stop state in the motor for a predetermined amount of time via the power supply relay, the motor drive circuit and the phase relay. Then, after the predetermined amount of time has elapsed, the switch of the power supply relay is switched off. That is, with the motor energization control, the temperature of the motor drive circuit increases at a higher gradient than the increase gradient of the coil temperature, and the temperature of the fixed contact of the power supply relay is increased due to heat transfer via the bus bar. Therefore, the relationship between the temperature of the fixed contact of the power supply relay and the temperature of the vicinity of the fixed contact (dependent on the coil temperature of the power supply relay) satisfies: fixed contact temperature<fixed contact ambient temperature, when in a temperature increase range up to a certain temperature, but shifts to a relationship that satisfies: fixed contact temperature>fixed contact ambient temperature, after entering a region exceeding the certain temperature. Then, the fixed contact and a movable contact of the power supply relay are disconnected from each other, after a predetermined amount of time has elapsed since the starting of the motor energization control. At this time, the temperature on the fixed contact side is reduced by heat radiation to the heat radiation part via a bus bar, and, moreover, the decrease gradient of the fixed contact temperature is greater than the decrease gradient of the fixed contact ambient temperature. However, since the relationship: fixed contact temperature>fixed contact ambient temperature is satisfied when the switch of the power supply relay is switched off, generation of a temperature difference between the fixed contact ambient temperature and the fixed contact temperature, which causes condensation, is suppressed to be small. As a result, it is possible to reduce the occurrence of condensation at a fixed contact of a power supply relay during an interruption operation of the power supply relay, without causing an increase in cost due to addition of a function.

BRIEF DESCRIPTION OF THE DRAWINGS

Referring now to the drawings, steer-by-wire system is illustrated.

DETAILED DESCRIPTION OF THE EMBODIMENTS

Figure 1:
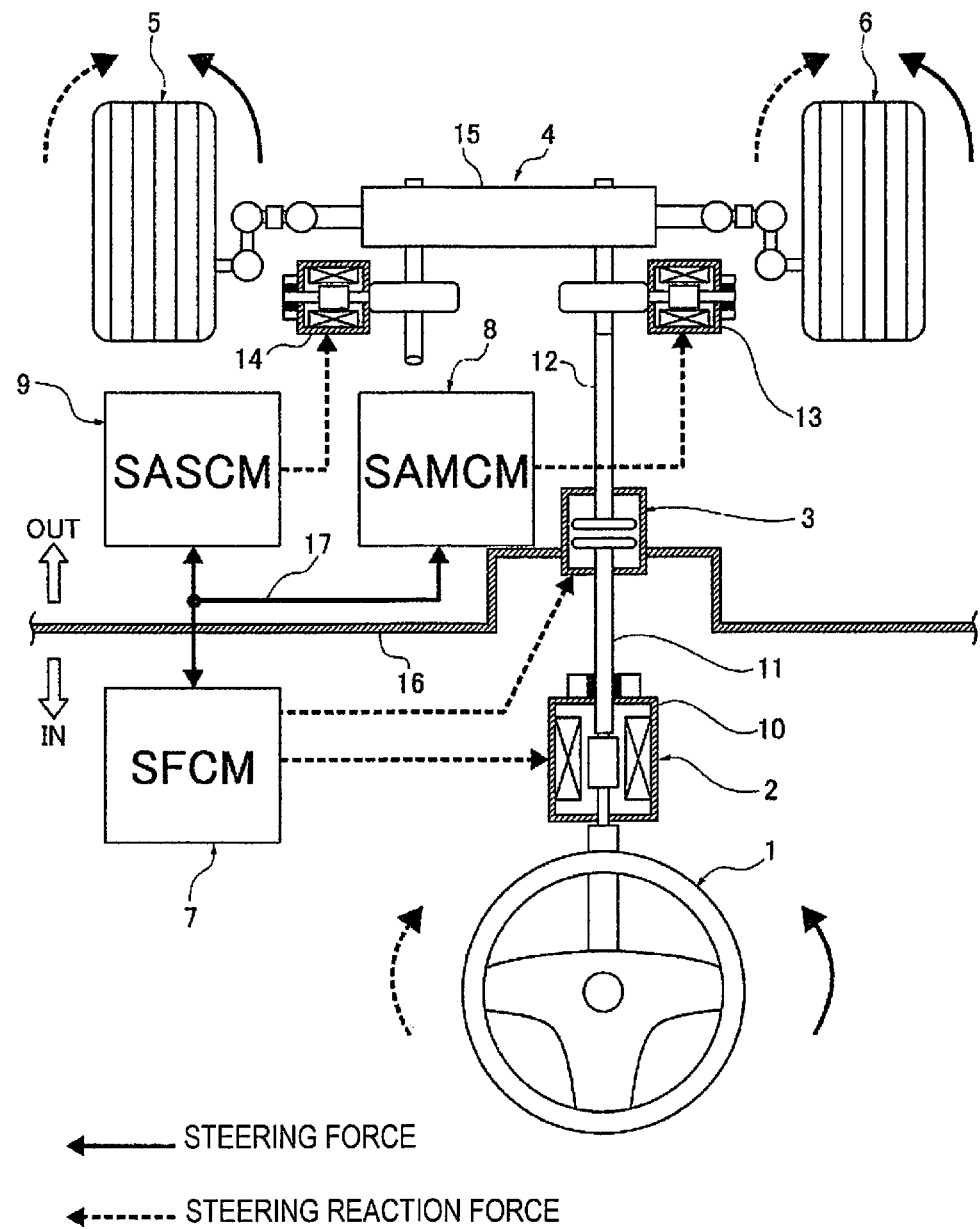
FIG. 1 is an overall system view illustrating a steer-by-wire system to which is applied the method and device for controlling relays of an in-vehicle motor according to the first embodiment.

A preferred embodiment for realizing the method and device for controlling relays of an in-vehicle motor according to the present invention is described below based on the first embodiment illustrated in the drawings.

First Embodiment

The configuration is described first. The method and device for controlling relays of an in-vehicle motor in the first embodiment are applied to a vehicle equipped with a steer-by-wire system that converts the movement of the steering wheel into electrical signals and transmits the electrical signals to the left and right front wheels. The "overall system configuration," the "configuration of the motor/clutch control system," the "detailed configuration of the control module," and the "configuration of the relay control steps" will be separately described below, regarding the configuration of the method and device for controlling relays of an in-vehicle motor according to the first embodiment.

Overall System Configuration

FIG. 1 shows a steer-by-wire system to which is applied the method and device for controlling relays of an in-vehicle motor according to the first embodiment. The overall system configuration will be described below, based on FIG. 1.

The steer-by-wire system comprises a steering wheel 1, a steering force actuator 2, a steering clutch 3, a steering angle actuator 4, a left front wheel 5, and a right front wheel 6, as illustrated in FIG. 1. Then, as the control system, a steering force control module 7, a steering angle main control module 8, and a steering angle sub control module 9 are provided.

The steering force actuator 2 comprises a three-phase alternating current steering force motor 10, which generates a torque corresponding to the reaction force from the road surface by a drive current from the steering force control module 7, with respect to a steering operation force that is applied to the steering wheel 1.

The steering clutch 3 has an electromagnetic clutch structure, and when energized by the steering force control module 7, the clutch is released and the upper and lower steering shafts 11, 12 are disconnected. When in a system protection mode or at the time of a system abnormality, energization by the steering force control module 7 is interrupted, the clutch is engaged, and the upper and lower steering shafts 11, 12 are mechanically coupled.

The steering angle actuator 4 described above is an actuator that is capable of steering the left and right front wheels 5, 6 when the steering clutch 3 is released, and comprises a steering angle main motor 13, a steering angle sub motor 14, and a steering gear mechanism 15. The steering angle main motor 13 is a three-phase alternating current motor, which generates a steering torque by a drive current from the steering angle main control module 8. The steering angle sub motor 14 is a three-phase alternating current motor, which generates a steering torque by a drive current from the steering angle sub control module 9. The steering gear mechanism 15 converts pinion torque to rack axial force, rotates a knuckle arm, and changes the orientation of the left front wheel 5 and the right front wheel 6.

The steering force control module 7 is disposed in the cabin interior, on the inner side of the dash panel 16, as illustrated in FIG. 1. On the other hand, the steering angle main control module 8 and the steering angle sub control module 9 are disposed in the cabin exterior exposed to the outside air, on the outer side of the dash panel 16, as illustrated in FIG. 1. The steering force control module 7, the steering angle main control module 8, and the steering angle sub control module 9 are connected via a FlexRay communication line 17 so as to be capable of exchanging information with each other, as illustrated in FIG. 1.

Configuration of the Motor/Clutch Control System

Figure 2:
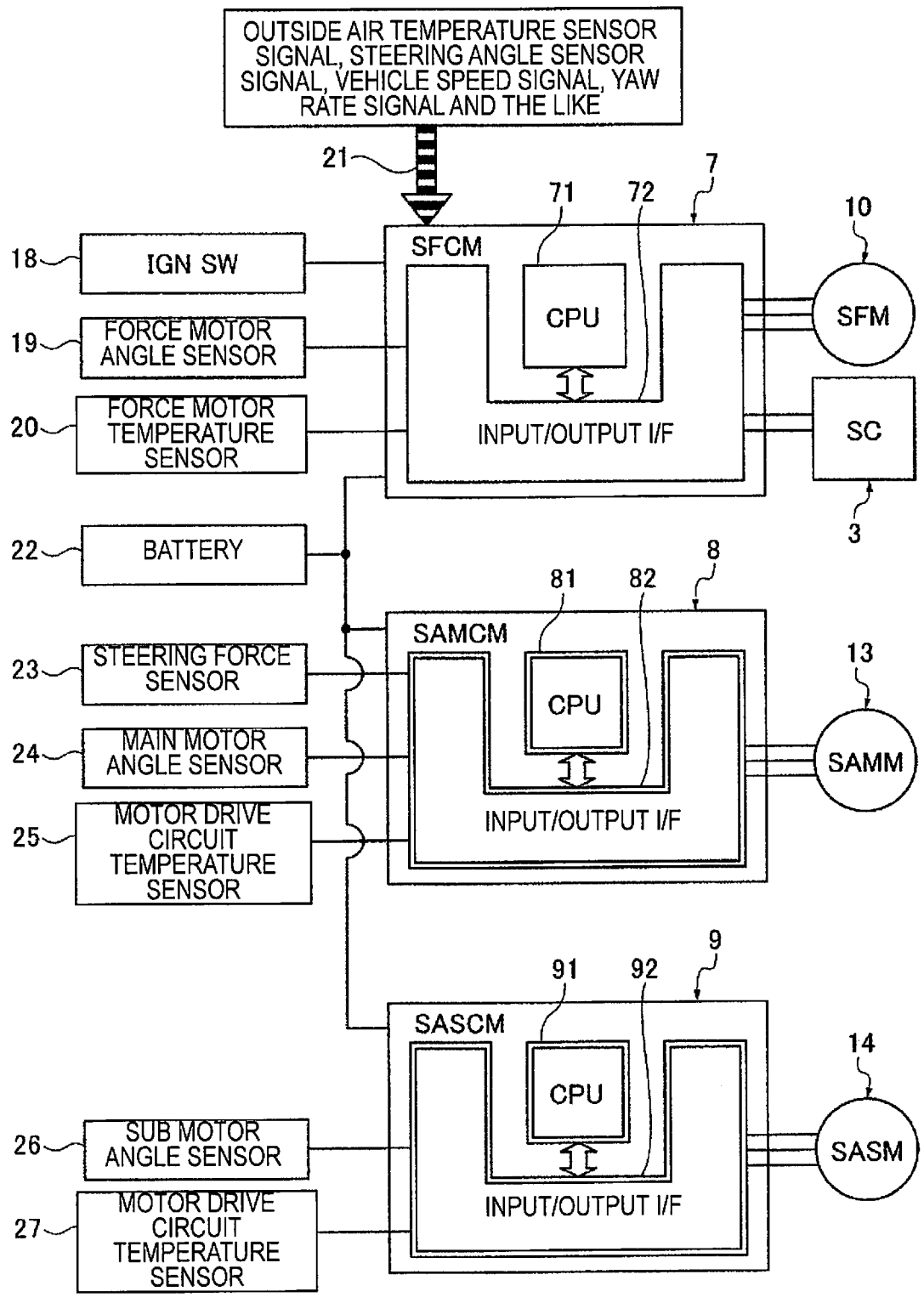
FIG. 2 is a control system block view illustrating a motor/clutch control system in a steer-by-wire system.

FIG. 2 illustrates the motor/clutch control system in the steer-by-wire system. The configuration of the motor/clutch control system will be described below based on FIG. 2.

The steering force control module 7 controls the driving of the steering force motor 10 and engagement/disengagement control of the steering clutch 3, and comprises a CPU 71 and an input/output interface 72, as illustrated in FIG. 2. A switch signal from the ignition switch 18, and sensor signals from a force motor angle sensor 19 and a force motor temperature sensor 20 are input to this steering force control module 7. In addition, information such as outside air temperature sensor signals, steering angle sensor signals, vehicle speed signals, and yaw rate signals are input via a CAN communication line 21. Furthermore, battery power is supplied from a battery 22.

In this steering force control module 7, during a steer-by-wire control (=during SBW control), a turning command steering angle is calculated from the steering angle sensor signal, the vehicle speed signal, the yaw rate signal, and the steering angle speed signal and sent to the steering angle main control module 8 (turning command steering angle calculation function). Furthermore, the steering reaction force equivalent to the tire reaction force is calculated from the steering angle sensor signal, the steering angle motor angle, the steering motor current, and the vehicle speed signal, to drive the steering force motor 10 (steering reaction force control function).

The steering angle main control module 8 controls the driving of the steering angle main motor 13, and comprises a CPU 81 and an input/output interface 82, as illustrated in FIG. 2. Sensor signals from a steering angle torque sensor 23, a main motor angle sensor 24, and a motor drive circuit temperature sensor 25 (thermistor) are input to the steering angle main control module 8. Furthermore, battery power is supplied from a battery 22.

In this steering angle main control module 8, during SBW control, the steering angle main motor 13 is driven by a servo command current calculated from the turning command steering angle and the main motor angle, and the command current corresponding to the assistance is transmitted to the steering angle sub control module 9.

The steering angle sub control module 9 is for controlling the driving of the steering angle sub motor 14, and comprises a CPU 91 and an input/output interface 92, as illustrated in FIG. 2. Sensor signals from a sub motor angle sensor 26 and the motor drive circuit temperature sensor 27 (thermistor) are input to the steering angle sub control module 9. Furthermore, battery power is supplied from a battery 22.

In this steering angle sub control module 9, during SBW control, the steering angle sub motor 14 is driven by a servo command current sent from the steering angle main control module 8 to carry out an assist operation (steering angle servo control function).

Detailed Configuration of the Control Module

Figure 3:
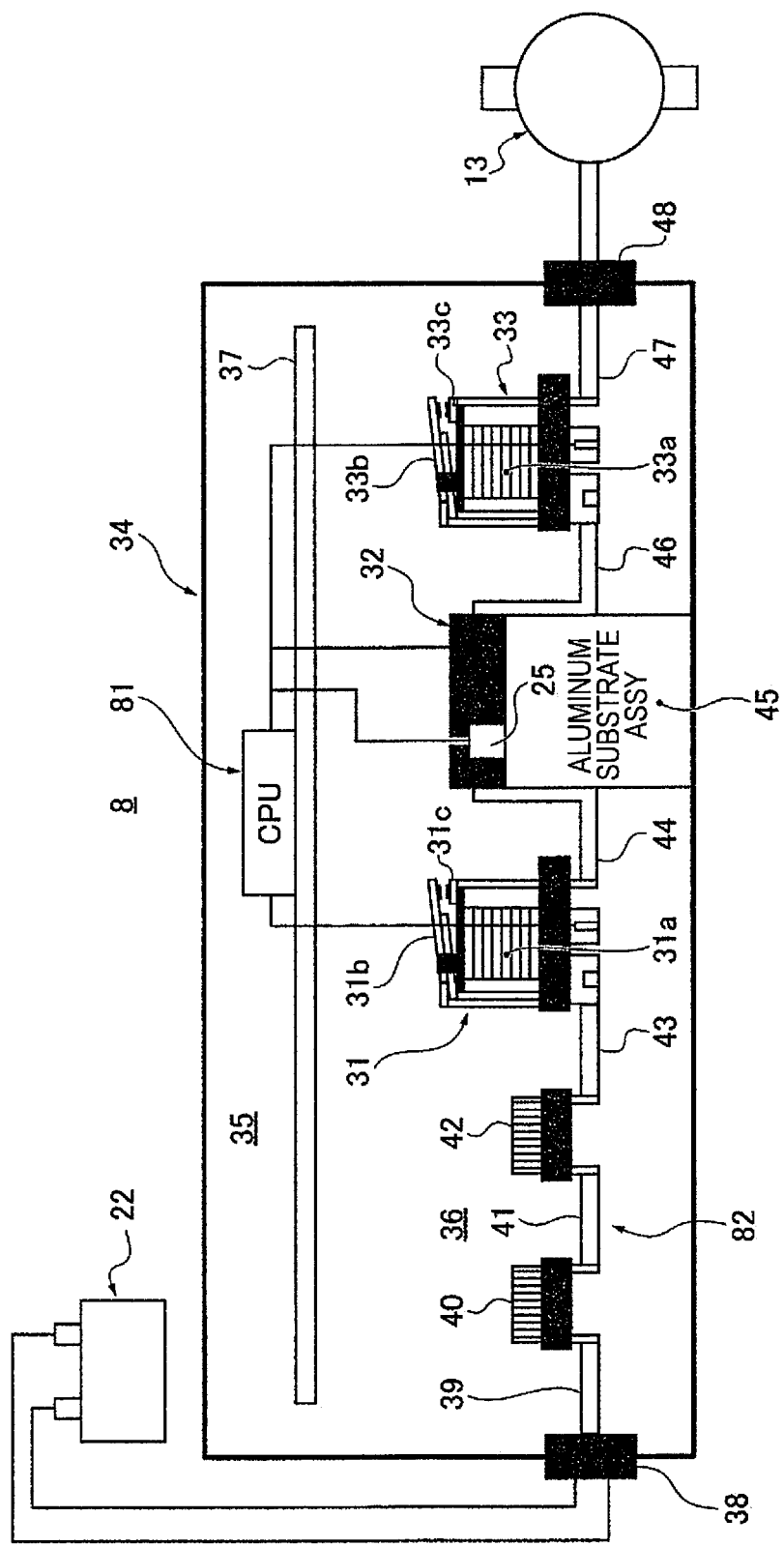
FIG. 3 is a cross-sectional view illustrating the configuration of a steering angle main control module that controls the driving of a steering angle main motor.

FIG. 3 shows the configuration of the steering angle main control module 8 that controls the driving of the steering angle main motor 13. The detailed configuration of the steering angle main control module 8 (corresponding to the motor control module) will be described below, based on FIG. 3. Although not shown or described, the steering angle sub control module 9 (corresponding to the motor control module) is configured in the same manner as the steering angle main control module 8.

The steering angle main control module 8 comprises a CPU 81 and an input/output interface 82, as illustrated in FIG. 3. The input/output interface 82 comprises a power supply relay 31, a motor drive circuit 32, and a phase relay 33.

The CPU 81 is for controlling the operations of the power supply relay 31, the motor drive circuit 32, and the phase relay 33, and is provided on a substrate 37 that is disposed inside a housing 34 formed using aluminum alloy, and that partitions the internal space into two spaces 35, 36. That is, the CPU 81 is disposed in the space 35 of the housing 34.

The power supply relay 31 is disposed in the space 36 of the housing 34, and is connected to the battery 22 (in-vehicle auxiliary battery) via a battery connector 38, a bus bar 39, a common mode coil 40, a bus bar 41, a normal mode coil 42, and a bus bar 43. This power supply relay 31 comprises a relay coil 31a, a movable contact 31b, and a fixed contact 31c; the movable contact 31b is connected to the bus bar 43 and the fixed contact 31c is connected to the bus bar 44.

The motor drive circuit 32 is connected to the fixed contact 31c of the power supply relay 31 via the bus bar 44, and is provided in contact with a heat radiation part 45 (aluminum substrate assembly) that has a higher thermal conductivity than the power supply relay 31. This heat radiation part 45 may be configured by, for example, increasing the thickness of a portion of the housing 34, made of aluminum, to provide sufficient heat capacity thereto. This motor drive circuit 32 is configured from a switching circuit, such as an FET. In addition, a motor drive circuit temperature sensor 25 constituting a thermistor is provided to the heat radiation part 45.

The phase relay 33 is connected to the motor drive circuit 32 via the bus bar 46. This phase relay 33 comprises a relay coil 33a, a movable contact 33b, and a fixed contact 33c; the movable contact 33b is connected to the bus bar 46 and the fixed contact 33c is connected to the steering angle main motor 13 via the bus bar 47 and a motor connector 48. Although one relay is shown in FIG. 3 as the phase relay 33, two phase relays 33 are provided corresponding to two phases from among the U-phase, the V-phase, and the W-phase of the steering angle main motor 13 (for example, the U-phase and the V-phase).

Configuration of the Relay Control Steps

Figure 4:
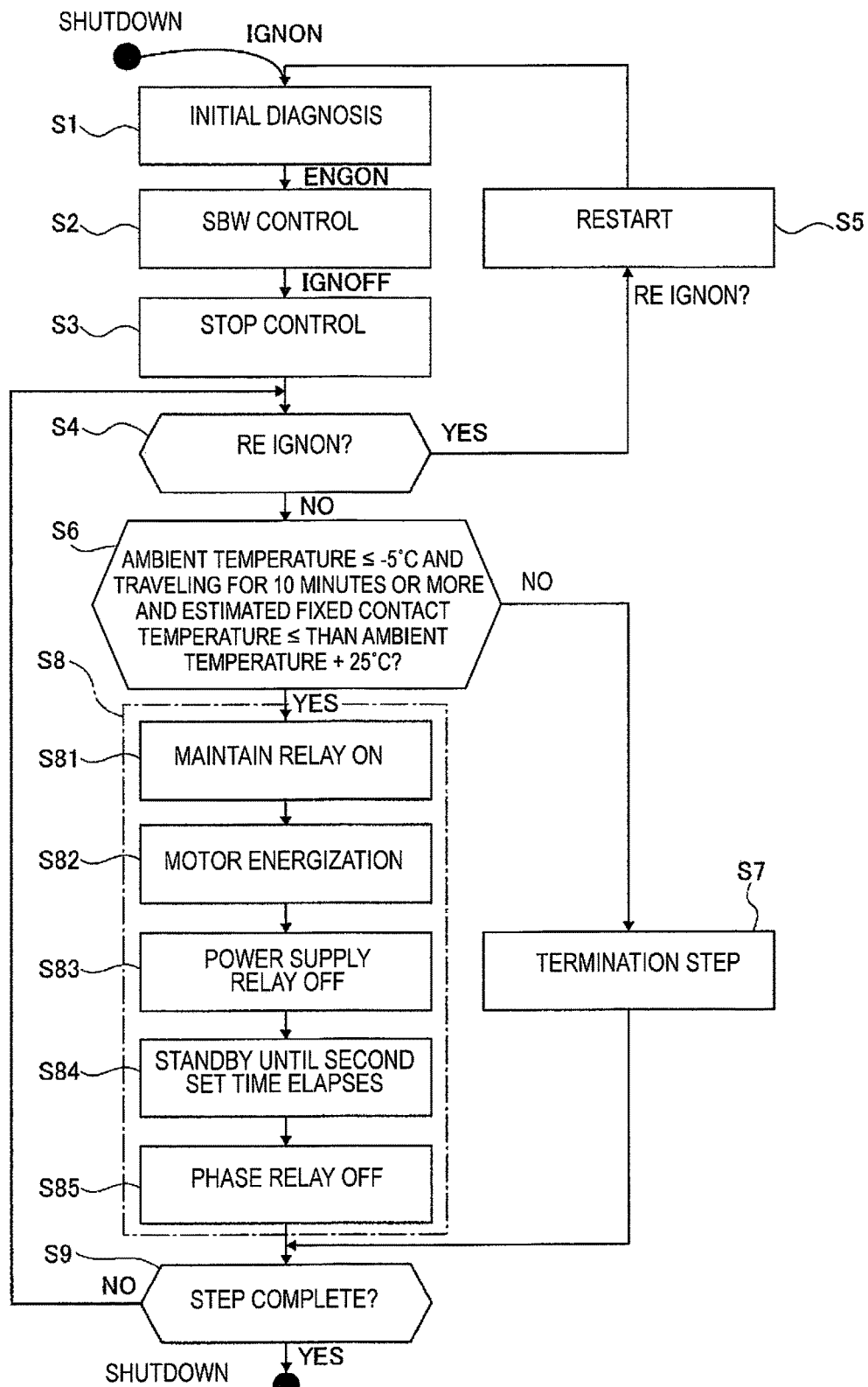
FIG. 4 is a flowchart illustrating the flow of relay control steps in the first embodiment, which is executed by a CPU of the steering angle main control module.

FIG. 4 illustrates the flow of the relay control steps in the first embodiment that is executed by the CPU 81 (corresponding to a controller) of the steering angle main control module 8. Each of the steps in FIG. 4, which represents the relay control steps configuration, will be described below. Although not shown or described, similar relay control steps are also executed in the CPU 91 (corresponding to a controller) of the steering angle sub control module 9.

In Step S1, when an ignition ON operation is carried out, an initial diagnosis of the system for diagnosing required check items is carried out, the system is started after the initial diagnosis, and the steps proceed to Step S2.

In Step S2, following an engine operation (ENG ON) after the system activation in Step S1, a steer-by-wire control (SBW control) is carried out until there is an ignition OFF operation, and the steps proceed to Step S3. In this SBW control, the steering force control module 7 exerts the turning command steering angle calculation function and the steering reaction force control function, and the steering angle main control module 8 and the steering angle sub control module 9 exert the steering angle servo control function.

In Step S3, following an ignition OFF operation from the SBW control in Step S2, the SBW control is stopped and the steps proceed to Step S4.

In Step S4, following the stopping of the SBW control in Step S3, or the determination that the processing is incomplete in Step S9, it is determined whether or not an ignition ON operation has been carried out again. In the case of YES (re-ignition ON present), the steps proceed to Step S5, and if NO (re-ignition ON absent), the steps proceed to Step S6.

In Step S5, following a determination that re-ignition ON is present in Step S4, the system is restarted and the steps proceed to Step S1 (initial diagnosis).

In Step S6, following a determination that re-ignition ON is absent in Step S4, it is determined whether or not execution conditions for an anti-icing treatment are satisfied. In the case of YES (execution conditions satisfied), the steps proceed to Step S9, and if NO (execution conditions not satisfied), the steps proceed to Step S7.

Here, the execution conditions for an anti-icing treatment are:

Ambient temperature is −5° C. or lower (ambient temperature is obtained from the outside air temperature sensor information)

Traveling for 10 minutes or more (count the time that the vehicle has speed during ignition ON)

Estimated fixed contact temperature is equal to or less than the ambient temperature +25° C.

Then, when all three of the above-described conditions are satisfied, it is determined that the execution conditions for an anti-icing treatment are satisfied, and the execution conditions for an anti-icing treatment are determined to be not satisfied if even one of the above-described three conditions is not satisfied.

Here, the reason the ambient temperature condition of "ambient temperature is −5° C. or lower" is given is to specify an ambient temperature region in which condensed moisture would freeze.

The reason the traveling condition of "traveling for 10 minutes or more" is given is because the temperature rise of the power supply relay 31 would not be such that an anti-icing treatment would be required, under the condition.

Figure 5:
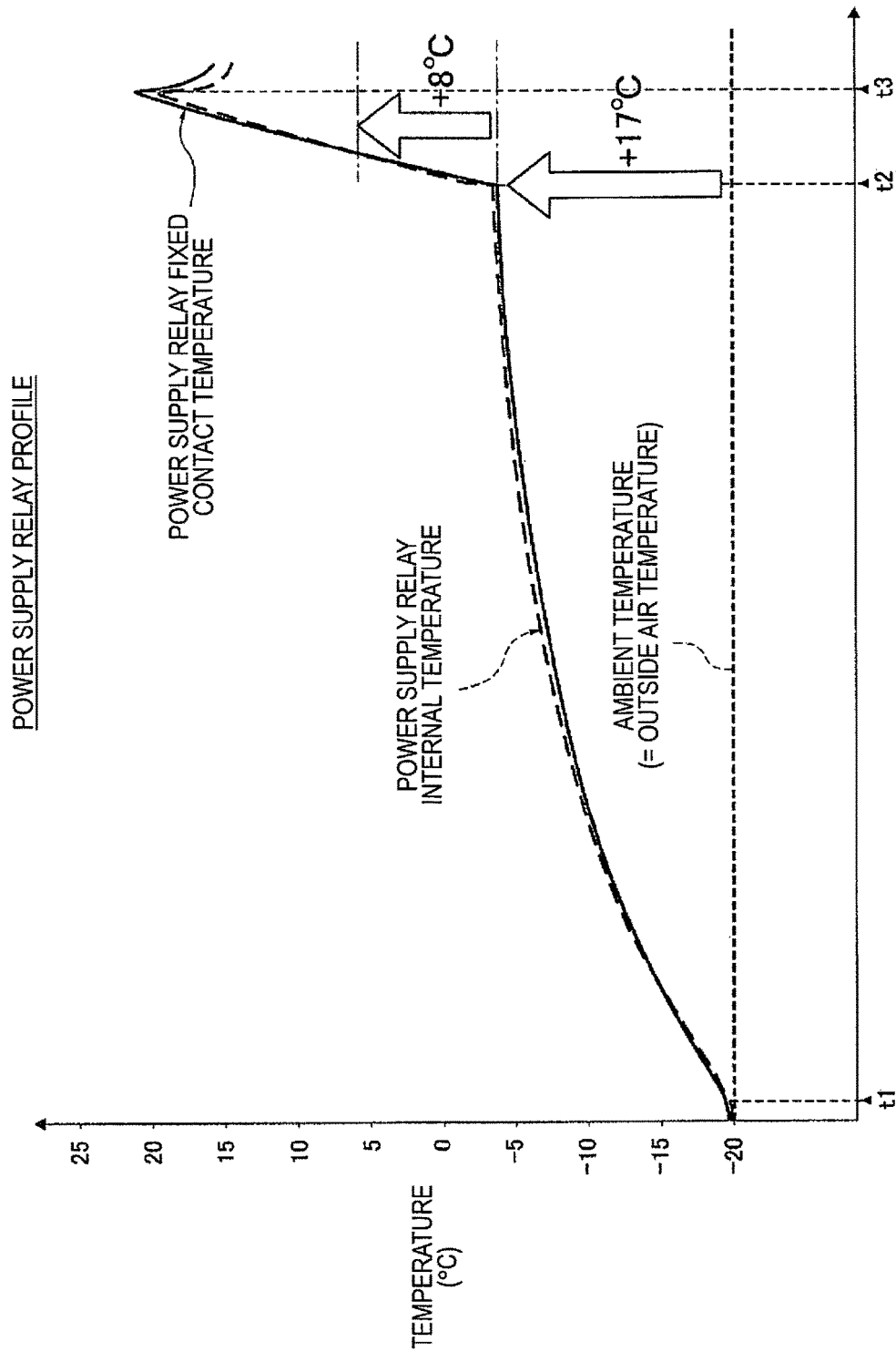
FIG. 5 is a temperature characteristic view of the power supply relay illustrating a power supply relay temperature profile for explaining the fixed contact temperature condition under which an anti-icing treatment is carried out.

The reason the fixed contact temperature condition of "estimated fixed contact temperature is equal to or less than the ambient temperature +25° C." is given is because in that case, the fixed contact temperature of the power supply relay 31 becomes higher than the internal temperature of the power supply relay 31 (=fixed contact ambient temperature), and an anti-icing treatment would not be required. That is, during the interval from time t1 to time t2 when only the power supply relay 31 is switched ON (no motor energization), the temperature rise is gentle and the maximum temperature (for example, +17° C.) is fixed (power supply relay fixed contact temperature<power supply relay internal temperature), as illustrated in FIG. 5. In contrast, during the motor energization interval from time t2 to time t3 while the power supply relay 31 is switched ON, the temperature rise is abrupt, and the state switches to power supply relay fixed contact temperature>power supply relay internal temperature mid-course. Since this switching temperature is in the vicinity of a rise of +8° C. after starting the motor energization, +25° C. (=17° C.+8° C.) was chosen as the condition.

The "estimated fixed contact temperature" is the estimated temperature of the fixed contact 31c when the power supply relay 31 is switched ON, and is estimated based on temperature information from the motor drive circuit temperature sensor 25.

In Step S7, following the determination that the execution conditions for an anti-icing treatment are not satisfied in Step S6, a termination step is carried out, in which the switch of the power supply relay 31 is turned off and the switch of the phase relay 33 is turned off, and the steps proceed to Step S9.

In Step S8, following the determination that the execution conditions for an anti-icing treatment are satisfied in Step S6, an anti-icing treatment (Steps S81-S85) is executed, and the steps proceed to Step S9.

In Step S9, following the termination step in Step S7, or the execution of an anti-icing treatment in Step S8, it is determined whether or not the termination step, or the anti-icing treatment, has been completed. In the case of YES (steps completed), the steps proceed to shutdown, and if NO (steps incomplete), the steps return to Step S4.

The anti-icing treatment in Step S8 will be described in detail. In Step S81, following the determination that the execution conditions for an anti-icing treatment are satisfied in Step S6, the switch of the power supply relay 31 and the switch of the phase relay 33 are both maintained in the on state for a first predetermined time, and the steps proceed to Step S82.

Here, the "first predetermined time" is determined from the time at which the fixed contact temperature exceeds the fixed contact ambient temperature (=power supply relay internal temperature) when the fixed contact temperature of the power supply relay 31 is raised by the motor energization control, and is, for example a time of about 30 seconds to 1 minute.

In Step S82, following the maintenance of relay ON in Step S81, a motor energization control for maintaining a rotation stop state of the steering angle main motor 13 is carried out by a command to the motor drive circuit 32 until the first predetermined time has elapsed, and the steps proceed to Step S83.

Here, in the "motor energization control," a linear current is imparted, whereby the current value for outputting a motor torque in a motor stopped state does not change, rather than a sinusoidal current for when the steering angle main motor 13 is rotationally driven.

In Step S83, following the motor energization in Step S82, when the first predetermined time has elapsed from the start of the motor energization control, the switch of the power supply relay 31 is switched from on to off while the switch of the phase relay 33 is kept on, and the steps proceed to Step S84.

In Step S84, following the power supply relay OFF in Step S83, after standing by until a second predetermined time, which is longer than the first predetermined time, elapses after switching the switch of the power supply relay 31 off, the steps proceed to Step S85.

Here, the "second predetermined time" is the standby time until the contact portion temperature of the phase relay 33 is further reduced mainly by heat radiation from the heat radiation part 45 and the temperature difference thereof from the ambient temperature becomes a predetermined value or less, and is set to, for example, about 500 seconds.

In Step S85, following the standby until the second predetermined time elapses in Step S84, the switch of the phase relay 33 is switched from on to off. When the steps proceed to Step S85, it is determined in Step S9 that the anti-icing treatment has been completed.

Next, the actions are described. The "action of the relay control step," the "action of the relay control in the comparative example," the "action of the relay control in the first embodiment," and the "characteristic action of the relay control" will be separately described, regarding the actions of the method and device for controlling relays of an in-vehicle motor according to the first embodiment.

Action of the Relay Control Step

The action of the relay control step will be described below, based on the flowchart of FIG. 4. When an ignition ON operation is carried out, an initial diagnosis of the system is carried out in Step S1, and the system is started after the initial diagnosis. When the engine is operated (ENG ON) after system activation, the steps proceed to Step S2, and in Step S2, a SBW control is carried out until there is an ignition OFF operation. Thereafter, when an ignition OFF operation is carried out, the steps proceed from Step S3→Step S4; in Step S3, the SBW control is stopped, and in Step S4, it is determined whether or not an ignition ON operation has been carried out again. When an ignition ON operation is carried out again, the steps proceed to Step S5, and in Step S5, the system is restarted and the steps proceed to the initial diagnosis of Step S1.

Then, if an ignition ON operation is not carried out again after the ignition OFF operation, the steps proceed to Step S6, and in Step S6, it is determined whether or not the execution conditions for an anti-icing treatment are satisfied. If it is determined that the execution conditions for an anti-icing treatment are not satisfied in Step S6, the steps proceed from Step S6 to Step S7→Step S9. In Step S7, a termination step is carried out in which the switch of the power supply relay 31 is turned off and the switch of the phase relay 33 is turned off. In Step S9, it is determined whether or not the termination step has been completed; if the termination step is incomplete, the steps return to Step S4, and it is determined whether or not an ignition ON operation has been carried out again. If an ignition ON operation has been carried out again, the steps proceed from Step S4 to Step S5, and in Step S5, the system is restarted and the steps proceed to the initial diagnosis of Step S1.

On the other hand, if it is determined that the execution conditions for an anti-icing treatment are satisfied in Step S6, the steps proceed from Step S6 to Step S8→Step S9, and in Step S8, an anti-icing treatment is carried out according to the following procedure. In Step S81, the switch of the power supply relay 31 and the switch of the phase relay 33 are both maintained in the on state for a first predetermined time. In Step S82, a motor energization control for maintaining a rotation stop state of the steering angle main motor 13 is carried out by a command to the motor drive circuit 32 until the first predetermined time has elapsed. In Step S83, when the first predetermined time elapses from the start of the motor energization control, the switch of the power supply relay 31 is switched from on to off The switch of the phase relay 33 is kept in the on state. In Step S84, the steps are put on standby until the second predetermined time (>first predetermined time) has elapsed from when the switch of the power supply relay 31 is switched to off. In Step S85, when the second predetermined time elapses, the switch of the phase relay 33 is switched from on to off If the anti-icing treatment is incomplete in Step S8, the steps return to Step S4, and it is determined whether or not an ignition ON operation has been carried out again. For example, if a re-ignition ON operation is carried out while executing the anti-icing treatment, the anti-icing treatment is stopped and the steps proceed from Step S4 to Step S5; in Step S5, the system is restarted, and the steps proceed to the initial diagnosis of Step S1.

Action of the Relay Control in the Comparative Example

Figure 6:
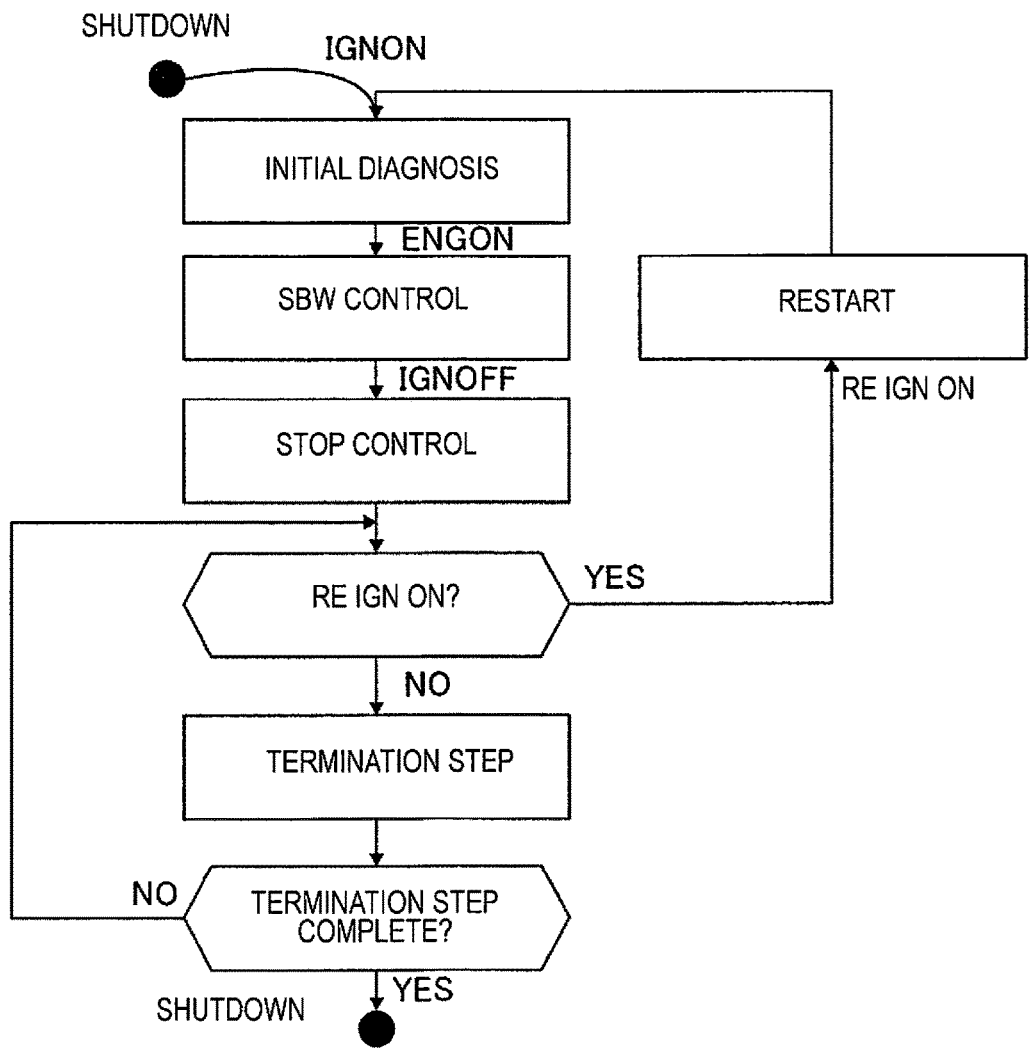
FIG. 6 is a flowchart illustrating the flow of the relay control steps in a comparative example.

First, a case in which, when an ignition OFF operation is carried out in the relay control, as illustrated in the flowchart of FIG. 6, unless a re-ignition ON operation is carried out, a termination step is carried out, in which the switch of the power supply relay is turned off and the switch of the phase relay is turned off, to shut down the system, shall be the comparative example.

Figure 7:
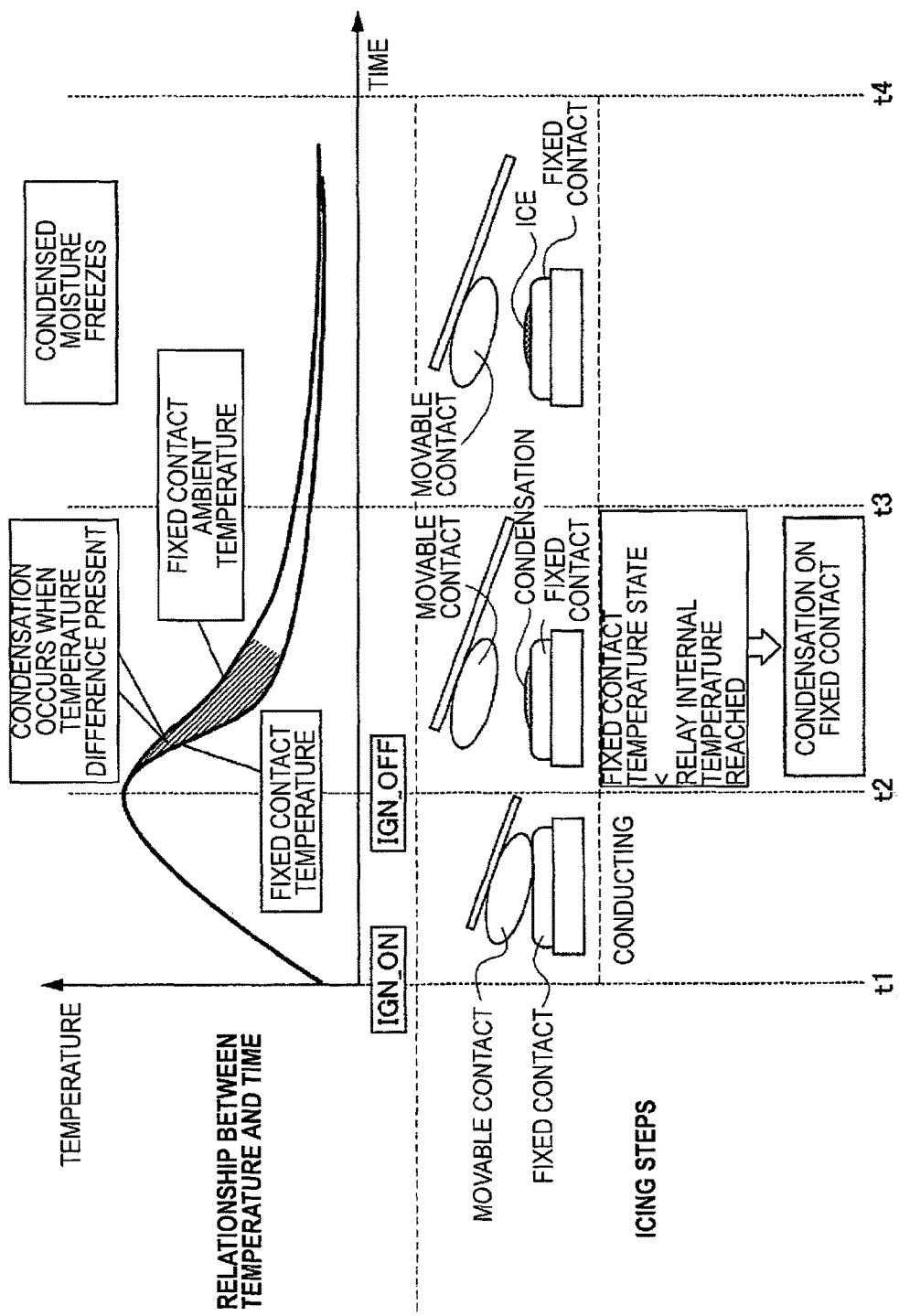
FIG. 7 is an explanatory view illustrating the mechanism for the occurrence of the problem that leads from condensation to icing after ignition OFF under a low ambient temperature in a comparative example.

The mechanism for the occurrence of the problem that leads from condensation to icing after ignition OFF under a low ambient temperature in the comparative example will be described, based on FIGS. 7-9. In FIG. 7, time t1 is the time of ignition ON. Time t2 is the time of ignition OFF. Time t3 is the time when the condensation moisture starts to ice. Time t4 is the time when the entire system converges with the outside air temperature.

Figure 8:
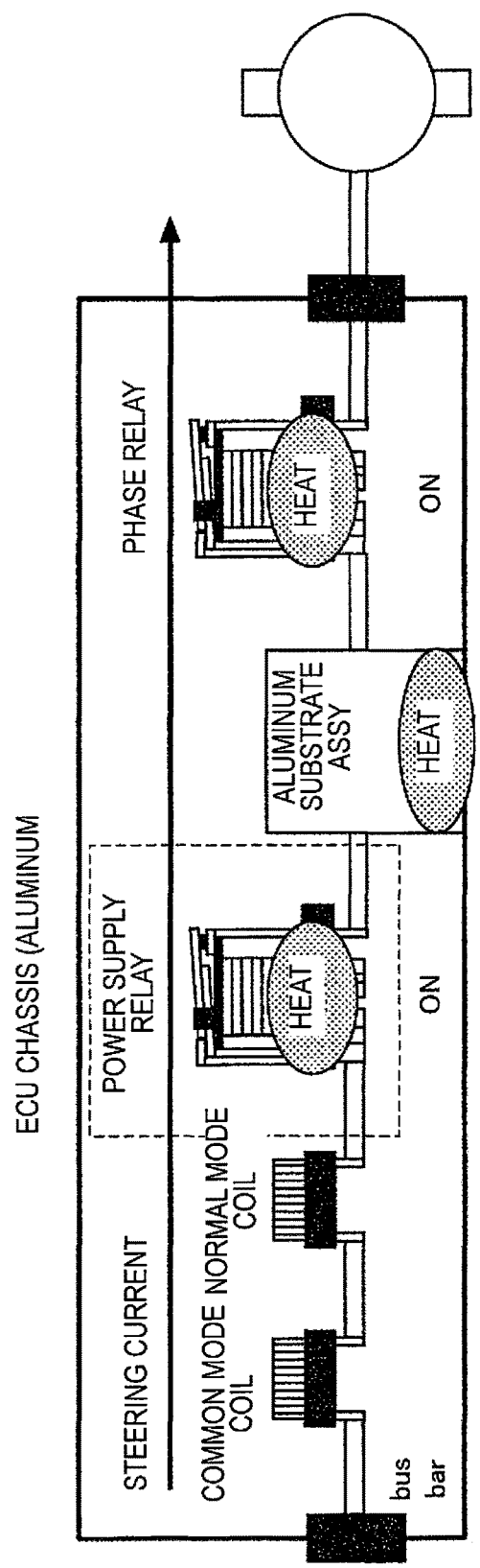
FIG. 8 is an operation explanatory view illustrating a motor energization state in an ignition ON state in a comparative example.

First, during the SBW control interval from time t1 to time t2, the switches of both the power supply relay and the phase relay are on, the motor is in an energized state by means of the steering current, and the fixed contact temperature and the fixed contact ambient temperature of the power supply relay both increase with the lapse of time, as illustrated in FIG. 8.

Figure 9:
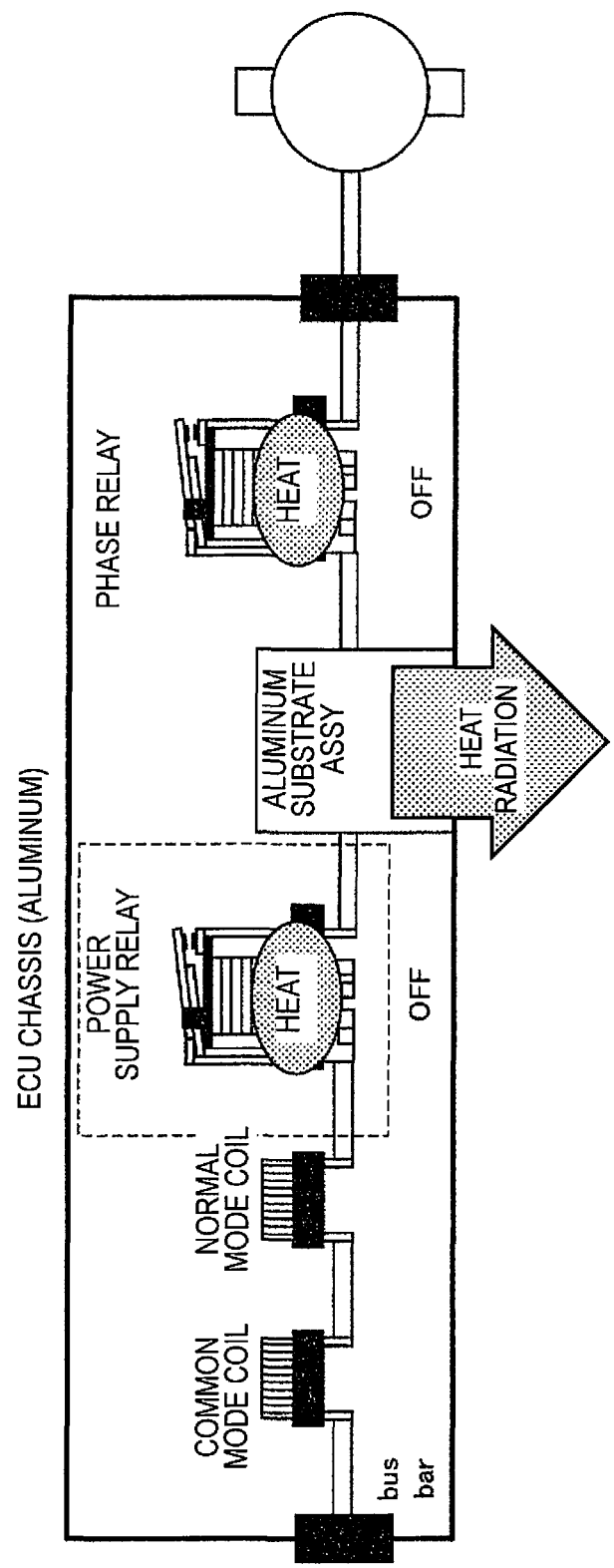
FIG. 9 is an operation explanatory view illustrating a switch OFF state of the power supply relay and the phase relay after an ignition ON→OFF in a comparative example.

Next, during the interval after ignition OFF from time t2 to time t3, the switches of both the power supply relay and the phase relay are turned off, as illustrated in FIG. 9. Paying attention to the power supply relay at this time, the temperature around the fixed contact including the movable contact decreases at a gentle gradient, due to the effect of the coil temperature. On the other hand, since the fixed contact of the power supply relay is connected to the heat radiation part via a bus bar having a high heat transfer capacity, the fixed contact temperature decreases at a steep gradient. Therefore, the relationship: fixed contact temperature<fixed contact ambient temperature (=relay internal temperature) is satisfied, and condensation occurs on the fixed contact of the power supply relay due to the presence of a temperature difference.

Next, during a temperature decrease interval from time t3 to time t4 of the contacts of the power supply relay, the condensed moisture on the fixed contact serving as the receiving surface begins to freeze due to the effect of the ambient temperature (=outside air temperature), and a frozen film is formed on the fixed contact of the power supply relay.

In this manner, if a frozen film remains formed on the fixed contact of the power supply relay, there is the possibility that the frozen film will inhibit motor energization by putting the power supply relay in a switch ON state, when an ignition ON operation is next carried out.

Action of the Relay Control in the First Embodiment

In contrast to the above-described comparative example, the first embodiment is a case in which an anti-icing logic is added at the time of the termination step after ignition OFF in the relay control. The action of the relay control in the first embodiment, which achieves condensation prevention and icing prevention after ignition OFF under a low ambient temperature, will be described below based on FIGS. 10-14.

Figure 10:
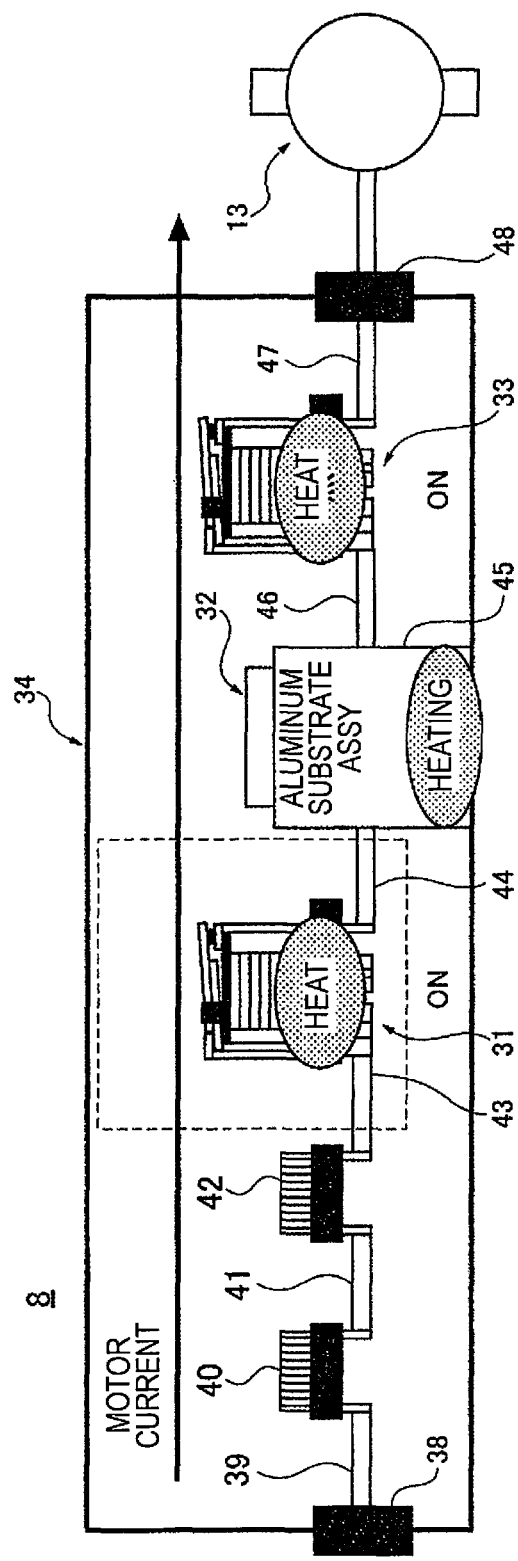
FIG. 10 is an operation explanatory view illustrating a motor energization control state after an ignition ON→OFF in the first embodiment.

After an ignition OFF, when an anti-icing treatment is started based on the establishment of the execution conditions for the anti-icing treatment, the switch of the power supply relay 31 and the switch of the phase relay 33 are both maintained in the on state for a first predetermined time, as illustrated in FIG. 10. Then, a motor energization control for maintaining a rotation stop state of the steering angle main motor 13 is carried out by a command to the motor drive circuit 32 until the first predetermined time has elapsed.

Figure 13:
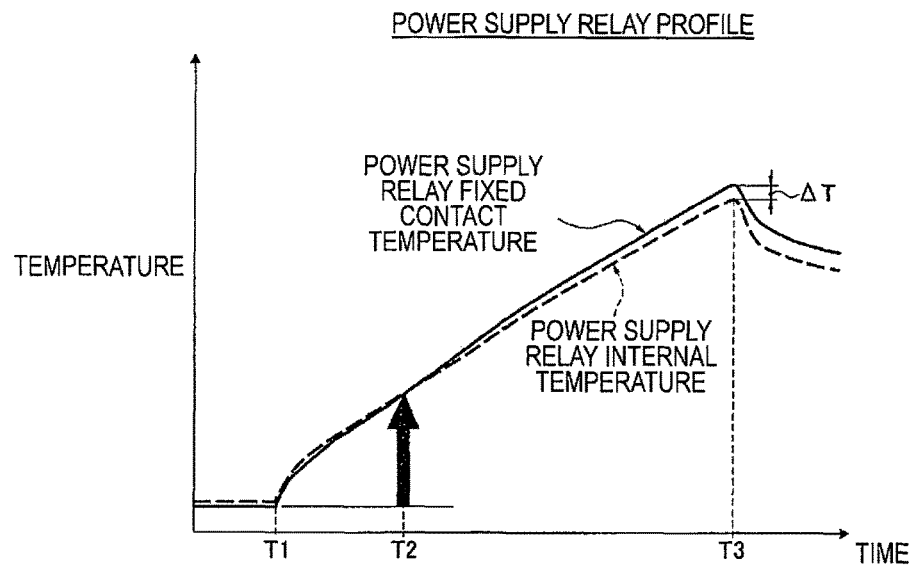
FIG. 13 is a temperature characteristic view of the power supply relay illustrating a power supply relay temperature profile when a motor energization control is carried out after ignition OFF in the first embodiment.
Figure 14:
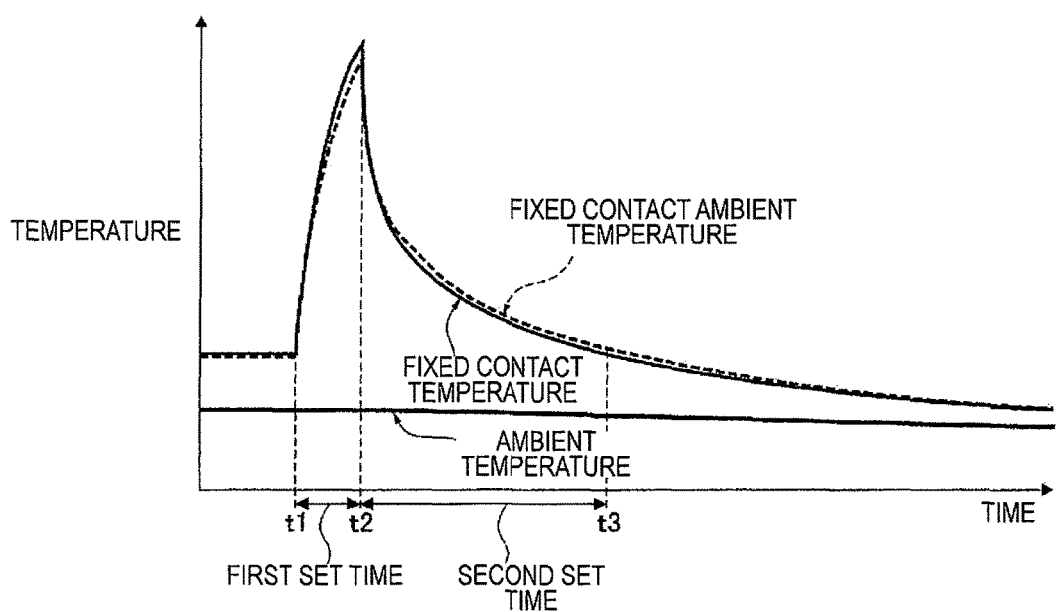
FIG. 14 is a time chart illustrating the relationship between the fixed contact ambient temperature, the fixed contact temperature, and the ambient temperature when motor energization control→power supply relay switch OFF→phase relay switch OFF is carried out after ignition OFF in the first embodiment.

That is, when the motor is energized, during the motor energization start interval, from time T1 to time T2, the relationship: power supply relay internal temperature>power supply relay fixed contact temperature is satisfied, as illustrated in FIG. 13. In contrast, in the interval from time T2 to the motor energization stop time T3, the relationship between the two temperatures is reversed to satisfy: power supply relay fixed contact temperature>power supply relay internal temperature, and a temperature difference ΔT occurs at the motor energization stop time T3. This is because the amount of heat supplied to the fixed contact 31c from the motor drive circuit 32 via the bus bar 44 is larger than the coil heat amount of the power supply relay 31 during motor energization, and thus the two temperature rise gradients are different. Therefore, if the motor is energized from the ignition OFF time t1 to time t2 when the first predetermined time has elapsed, the relationship: fixed contact temperature>fixed contact ambient temperature will be satisfied at time t2, as illustrated in FIG. 14.

Figure 11:
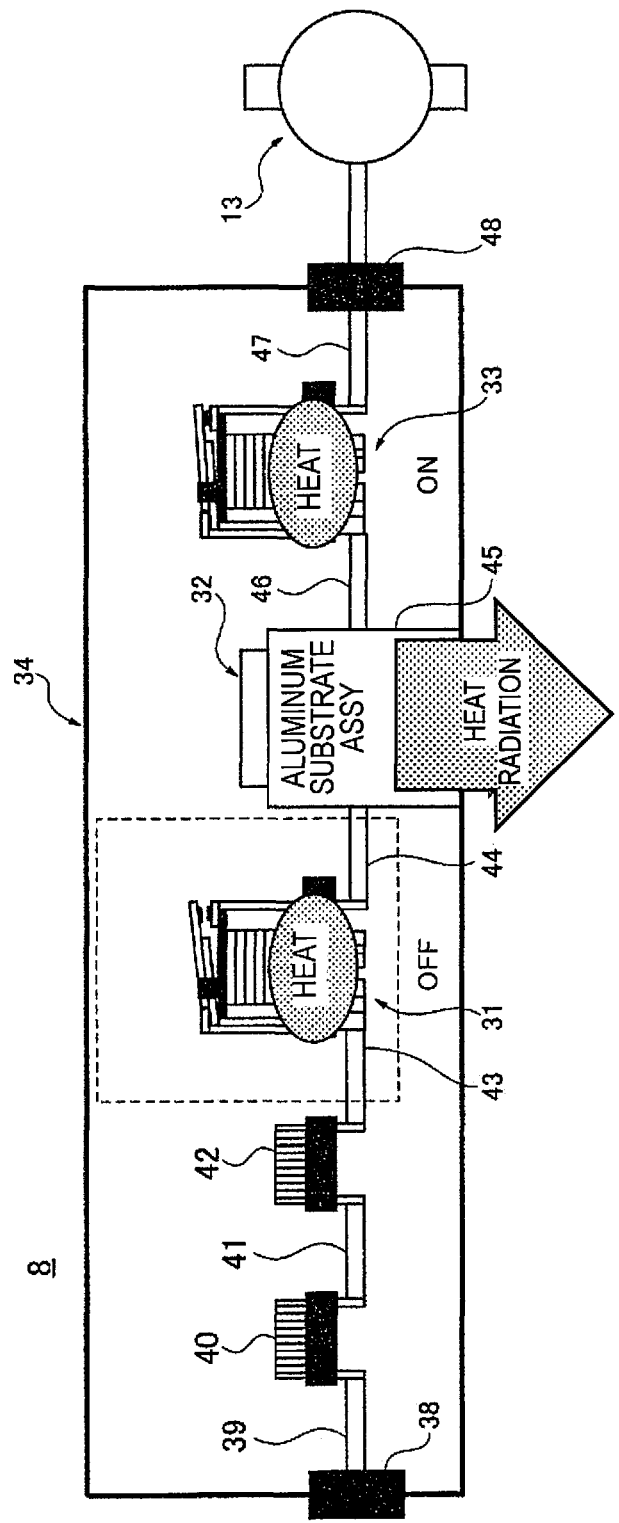
FIG. 11 is an operation explanatory view illustrating a switch OFF state of the power supply relay after a motor energization control in the first embodiment.

Next, when the first predetermined time elapses from the start of the motor energization control, the switch of the phase relay 33 is kept in the on state, whereas only the switch of the power supply relay 31 is switched from on to off, as illustrated in FIG. 11. Then, the steps are put on standby until the second predetermined time (>first predetermined time) has elapsed from when the switch of the power supply relay 31 is switched to off.

That is, when only the switch of the power supply relay 31 is switched from on to off, the temperature of the periphery of the fixed contact starts to decrease, and the temperature of the fixed contact 31c starts to decrease due to heat radiation from the fixed contact 31c of the power supply relay 31 via the bus bar 44 and the heat radiation part 45. However, at time t2, the relationship: fixed contact temperature>fixed contact ambient temperature is satisfied. Accordingly, as indicated by the two temperature characteristics in the interval from time t2-time t3 in FIG. 14, the temperature difference between the fixed contact temperature and the fixed contact ambient temperature is suppressed to be small, even if the temperature decrease gradient of the fixed contact 31c is larger than the temperature decrease gradient around the fixed contact. Occurrence of condensation caused by a temperature difference in the power supply relay 31 can thereby be suppressed.

Figure 12:
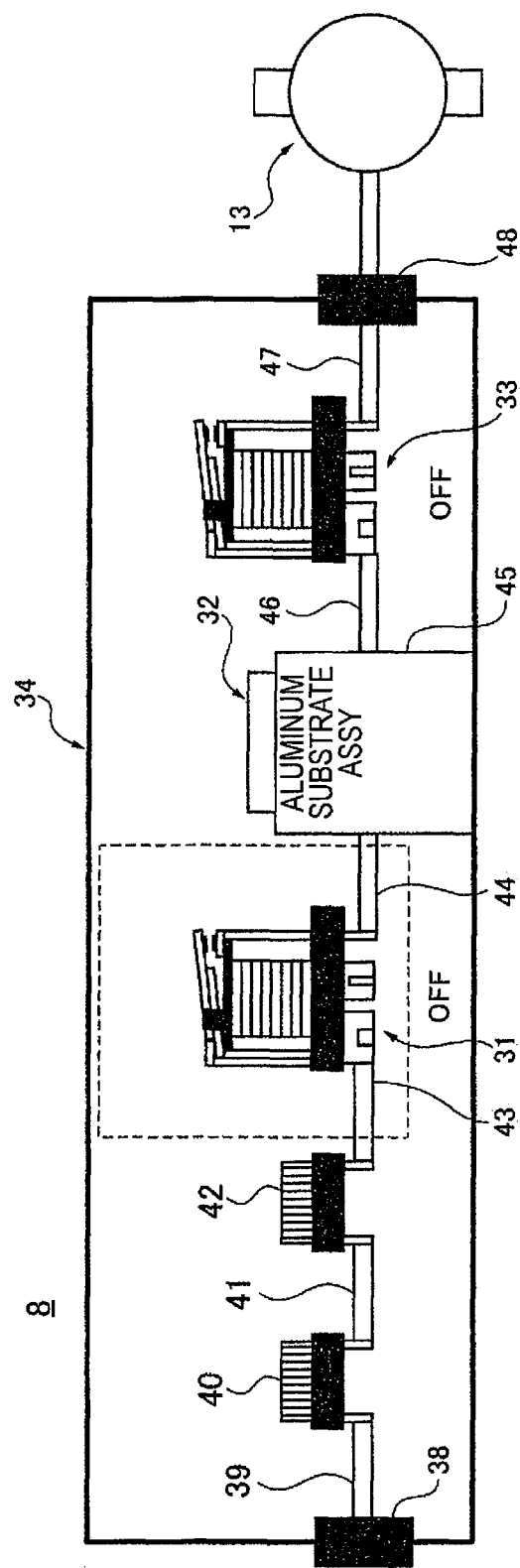
FIG. 12 is an operation explanatory view illustrating a switch OFF state of the phase relay after a switch OFF of the power supply relay in the first embodiment.

Next, when the second predetermined time elapses after turning the switch of the power supply relay 31 off, the switch of the phase relay 33 is switched from on to off, as illustrated in FIG. 12.

For example, it is assumed that the switch of the phase relay 33 is switched to off at the same time as the switch of the power supply relay 31 is switched to off. In this case, while the movable contact 33b of the phase relay 33 is in a high-temperature state from the motor drive circuit 32 via the bus bar 46, the fixed contact 33c of the phase relay 33 is affected by the low-temperature outside air via the bus bar 47 and the temperature thereof drops rapidly; therefore, there is the risk that a temperature difference occurs between the movable contact 33b and the fixed contact 33c of the phase relay 33 to cause condensation.

In contrast, by keeping the switch of the phase relay 33 on from when the switch of the power supply relay 31 is turned off until the second predetermined time elapses, it is possible to reduce the temperature of the movable contact 33b by heat radiation from the movable contact 33b of the phase relay 33 via the bus bar 46 and the heat radiation part 45. That is, it is possible to reduce the temperature of the movable contact 33b of the phase relay 33 at time t3 to the temperature level at the start of motor energization (time t1), as illustrated in FIG. 14. As a result, occurrence of condensation caused by a temperature difference in the phase relay 33 can also be suppressed.

In the first embodiment, an anti-icing logic is added at the time of the termination step after ignition OFF, as is clear from a comparison between FIG. 4 and FIG. 6. Accordingly, activation and SBW control are not affected. If a re-ignition ON operation is carried out while executing the anti-icing treatment, the anti-icing treatment is stopped to ensure a system restart. Furthermore, it is also possible to embed a logic in which, if a failure is detected during the execution of the anti-icing treatment, the step is stopped and the system is shut down, and failure is detected during the next startup.

Characteristic Action of the Relay Control

In the first embodiment, after the ignition is turned off, with the switches for the power supply relay 31 and the phase relay 33 remaining in the on state, a motor energization control for maintaining a rotation stop state in the steering angle main motor 13 for a predetermined amount of time via the power supply relay 31, the motor drive circuit 32, and the phase relay 33, and after the predetermined amount of time has elapsed, the switch of the power supply relay 31 is switched to off. That is, with the motor energization control, the temperature of the motor drive circuit 32 increases at a higher gradient than the increase gradient of the coil temperature, and the temperature of the fixed contact 31c of the power supply relay 31 is increased due to heat transfer via the bus bar 44. Therefore, the relationship between the temperature of the fixed contact of the power supply relay 31 and the temperature of the vicinity of the fixed contact (dependent on the coil temperature of the power supply relay 31) satisfies: fixed contact temperature<fixed contact ambient temperature, when in a temperature increase range up to a certain temperature, but shifts to a relationship that satisfies: fixed contact temperature>fixed contact ambient temperature, after entering a region exceeding the certain temperature. Then, when the first predetermined time elapses from the starting of the motor energization control, the fixed contact 31c and the movable contact 31b of the power supply relay 31 are disconnected from each other. At this time, the temperature on the fixed contact 31c side is reduced by heat radiation to the heat radiation part 45 via the bus bar 44, and, moreover, the decrease gradient of the fixed contact temperature is greater than the decrease gradient of the fixed contact ambient temperature. However, since the relationship: fixed contact temperature>fixed contact ambient temperature is satisfied when the switch of the power supply relay 31 is switched off, generation of a temperature difference between the fixed contact ambient temperature and the fixed contact temperature, which causes condensation, is suppressed to be small. As a result, it is possible to reduce the occurrence of condensation at the fixed contact 31c of the power supply relay 31 during an interruption operation of the power supply relay 31, without causing an increase in cost due to addition of a function.

In the first embodiment, when the first predetermined time elapses from the start of the motor energization control, the switch of the power supply relay 31 is switched to off. Then, the step is put on standby until the second predetermined time, which is longer than the first predetermined time, has elapsed from when the switch of the power supply relay 31 is switched to off, and when the second predetermined time elapses, the switch of the phase relay 33 is switched to off. For example, if the phase relay 33 is turned OFF at the same time as the power supply relay 31 after the motor energization control, the temperature of the fixed contact 33c of the phase relay 33 tends to become lower than the temperature inside the phase relay 33, creating the possibility of an occurrence of condensation on the fixed contact of the phase relay 33. On the other hand, by putting the fixed contact 33c and the movable contact 33b of the phase relay 33 in contact for a while, a temperature difference does not occur between the coil temperature of the phase relay 33 and the fixed contact 33c of the phase relay 33, and the possibility of condensation is reduced.

In the first embodiment, after the interruption operation of the power supply relay 31, the fixed contact temperature of the power supply relay 31 is estimated, and the motor energization control is carried out when a fixed contact temperature condition is satisfied in which the estimated fixed contact temperature is equal to or less than a temperature obtained by adding a predetermined temperature to the ambient temperature. That is, if the estimated fixed contact temperature exceeds a temperature obtained by adding a predetermined temperature to the ambient temperature, the temperature of the fixed contact 31c of the power supply relay 31 is high; therefore, the difference from the internal temperature of the power supply relay 31 is small, and the possibility of condensation occurring on the upper surface of the fixed contact 31c is low. That is, if the fixed contact temperature condition is not satisfied, it is not necessary to execute the motor energization control. Therefore, a motor energization control that prevents condensation in the power supply relay 31 is executed only when the control is necessary, and the battery 22 is not used unnecessarily.

In the first embodiment, a motor energization control is carried out when an ambient temperature condition is satisfied, in which the ambient temperature is equal to or less than the freezing temperature, after an interruption operation of the power supply relay 31. That is, when the ambient temperature is equal to or less than the freezing temperature, if condensation occurs on the upper surface of the fixed contact 31c of the power supply relay 31, there are cases in which the condensed moisture freezes and forms a frozen film. Therefore, by carrying out a motor energization control when an ambient temperature condition is satisfied in which the ambient temperature is equal to or less than the freezing temperature, icing at the contact portion of the power supply relay 31 is prevented.

Next, the effects are described. The effects listed below can be obtained by the method and device for controlling relays of an in-vehicle motor according to the first embodiment.

(1) A relay control method of an in-vehicle motor comprising a motor control module (steering angle main control module 8) that has, inside a housing 34, a power supply relay 31 connected to a battery 22, a motor drive circuit 32 connected to a fixed contact 31c of the power supply relay 31 via a bus bar 44, and a phase relay 33 connected to the motor drive circuit 32 via a bus bar 46, comprises providing the motor drive circuit 32 in contact with a heat radiation part 45 that has a higher thermal conductivity than the power supply relay 31, and performing a motor energization control for maintaining a rotation stop state in a motor (steering angle main motor 13) for a predetermined amount of time via the power supply relay 31, the motor drive circuit 32 and the phase relay 33, after an interruption operation of the power supply relay 31 (after ignition OFF) while the switches for the power supply relay 31 and the phase relay 33 remain in an on state, and then switching the switch of the power supply relay 31 to off after the predetermined amount of time has elapsed. Accordingly, it is possible to provide a relay control method for reducing the occurrence of condensation at the fixed contact 31c of the power supply relay 31 during an interruption operation of the power supply relay 31, without causing an increase in cost due to addition of a function.

(2) When a first predetermined time elapses from the start of the motor energization control, the switch of the power supply relay 31 is switched to off, and putting on standby the switching of the switch of the power supply relay 31 to off until a second predetermined time, which is longer than the first predetermined time, has elapsed from when the switching of the switch of the power supply relay 31 is switched to off, and switching the switch of the phase relay 33 is switched to off when the second predetermined time elapses. Accordingly, in addition to the effect of (1), it is possible to reduce the occurrence of condensation at the fixed contact 33c of the phase relay 33 during an interruption operation of the power supply relay 31.

(3) After the interruption operation of the power supply relay 31, estimating a fixed contact temperature of the power supply relay 31, and the performing of the motor energization control is carried out when a fixed contact temperature condition is satisfied, in which the estimated fixed contact temperature is equal to or less than a temperature obtained by adding a predetermined temperature to the ambient temperature. Accordingly, in addition to the effect of (1) or (2), it is possible to execute a motor energization control that prevents condensation in the power supply relay 31 while suppressing power consumption in the battery 22.

(4) A motor energization control is carried out when an ambient temperature condition is satisfied in which the ambient temperature is equal to or less than the freezing temperature, after an interruption operation of the power supply relay 31. Accordingly, in addition to the effects of (1) to (3), it is possible to reduce the occurrence of icing in which the moisture condensed at the fixed contact 31c of the power 31 freezes.

(5) A relay control device of an in-vehicle motor, comprises a motor control module (steering angle main control module 8) that has, inside a housing 34, a power supply relay 31 connected to a battery 22, a motor drive circuit 32 connected to a fixed contact 31c of the power supply relay 31 via a bus bar 44, and a phase relay 33 connected to the motor drive circuit 32 via a bus bar 46, wherein the motor drive circuit 32 is provided in contact with a heat radiation part 45 that has a higher thermal conductivity than the power supply relay 31, and a controller (CPU 81) of the motor control module (steering angle main control module 8) configured to carries out a process of a motor energization control for maintaining a rotation stop state in a motor (steering angle main motor 13) for a predetermined amount of time via the power supply relay 33, the motor drive circuit 32, and the phase relay 31, after an interruption operation of the power supply relay 31 (after ignition OFF) while the switches for the power supply relay 31 and the phase relay 33 remain in an on state, and switching the switch of the power supply relay 31 to off after the predetermined amount of time has elapsed. Accordingly, it is possible to provide a relay control device for reducing the occurrence of condensation at the fixed contact 31c of the power supply relay 31 during an interruption operation of the power supply relay 31, without causing an increase in cost due to addition of a function.

The method and device for controlling relays of an in-vehicle motor of the present invention were described above based on the first embodiment, but specific configurations thereof are not limited to the first embodiment, and various modifications and additions to the design can be made without departing from the scope of the invention according to each claim in the Claims.

In the first embodiment, an example was shown of an anti-icing treatment by timer management, using a first predetermined time and a second predetermined time, which are determined in advance. However, the anti-icing treatment may be by temperature management, in which the ambient temperature and the relay temperature are monitored, and the timing for power supply relay OFF and the timing for phase relay OFF, corresponding to the first predetermined time and the second predetermined time, are obtained from a temperature determination. In the case of an anti-icing treatment by temperature management, the first predetermined time and the second predetermined time will change according to the ambient temperature, and the like.

In the first embodiment, an example was shown in which three conditions are given as the execution conditions for the anti-icing treatment: ambient temperature is −5° C. or lower, traveling for 10 minutes or more, and estimated fixed contact temperature is equal to or less than the ambient temperature +25° C. However, the execution condition for an anti-icing treatment may be such that an anti-icing treatment is always carried out without any conditions. In addition, one of the three execution conditions may be used, or any two of the conditions may be used in combination.

In the first embodiment, an example was shown in which the method and device for controlling relays of an in-vehicle motor of the present invention are applied to a steering angle main motor 13 and a steering angle sub motor 14 of a steer-by-wire system. However, the method and device for controlling relays of an in-vehicle motor of the present invention may be applied to various in-vehicle motors, such as an assist motor of a power steering system, an electric booster motor of a brake system, and a traveling motor of an electrically driven vehicle. In short, the present invention can be applied to any in-vehicle motor having a power supply relay, a motor drive circuit, and a phase relay in the motor control module.

The invention claimed is:

1. A relay control method of an in-vehicle motor comprising a motor control module that has, inside a housing, a power supply relay connected to a battery, a motor drive circuit connected to a fixed contact of the power supply relay via a bus bar, and a phase relay connected to the motor drive circuit via a bus bar, the relay control method comprising:
   providing the motor drive circuit in contact with a heat radiation part that has a higher thermal conductivity than the power supply relay; and
   performing a motor energization control for maintaining a rotation stop state in the motor for a first predetermined time via the power supply relay, the motor drive circuit and the phase relay, after an interruption operation of the power supply relay while switches for the power supply relay and the phase relay remain in an on state, and then switching the switch of the power supply relay to off after the first predetermined time has elapsed.

2. The relay control method according to claim 1, wherein
   when the first predetermined time elapses from a start of the motor energization control, the switching of the switch of the power supply relay is switched to off, and
   putting on standby the switching of the switch of the power supply relay to off until a second predetermined time, which is longer than the first predetermined time, has elapsed from when the switching of the switch of the power supply relay is switched to off, and
   switching the switch of the phase relay is switched to off when the second predetermined time elapses.

3. The relay control method according to claim 1, wherein
   after the interruption operation of the power supply relay, estimating a fixed contact temperature of the power supply relay, and the performing of the motor energization control is carried out when a fixed contact temperature condition is satisfied in which the fixed contact temperature is estimated to be equal to or less than a temperature obtained by adding a predetermined temperature to an ambient temperature.

4. The relay control method according to claim 1, wherein
   the performing of the motor energization control is carried out when an ambient temperature condition is satisfied in which an ambient temperature is equal to or less than a freezing temperature, after the interruption operation of the power supply relay.

5. A relay control device of an in-vehicle motor, the relay control device comprising:
   a motor control module having a housing, a power supply relay inside the housing and connected to a battery, a motor drive circuit inside the housing and connected to a fixed contact of the power supply relay via a bus bar, and a phase relay inside the housing and connected to the motor drive circuit via a bus bar,
   the motor drive circuit being provided in contact with a heat radiation part that has a higher thermal conductivity than the power supply relay, and
   the motor control module having a controller configured to carries out a process of
   a motor energization control for maintaining a rotation stop state in the motor via the power supply relay, the motor drive circuit and the phase relay is held for a predetermined amount of time, after an interruption operation of the power supply relay while switches for the power supply relay and the phase relay remain in an on state, and
   switching the switch of the power supply relay to off after the predetermined amount of time has elapsed.

* * * * *